United States Patent
Oomura (12) 
(10) Patent No.: US 6,272,030 B1
(45) Date of Patent: Aug. 7, 2001

(54) DIVIDING, ISOLATING, AND RECTIFYING CIRCUIT AND STANDBY POWER SOURCE

(75) Inventor: Tadashi Oomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/641,748

(22) Filed: Aug. 18, 2000

(30) Foreign Application Priority Data

Aug. 20, 1999 (JP) .................................................. 11-233848

(51) Int. Cl.[7] .................................................. H02M 3/06
(52) U.S. Cl. .............................. 363/62; 363/126; 363/146
(58) Field of Search ............................. 363/620, 126, 363/146

(56) References Cited

U.S. PATENT DOCUMENTS

| | | | |
|---|---|---|---|
| 3,237,079 | * | 2/1966 | Mas ...................................... 363/146 |
| 3,379,952 | * | 4/1968 | Tarrson ................................. 363/146 |
| 4,109,193 | * | 8/1978 | Schultheis ............................ 363/146 |
| 4,626,981 | * | 12/1986 | Su et al. ................................. 363/62 |
| 4,982,316 | | 1/1991 | Nakayama ............................ 363/53 |
| 5,615,103 | * | 3/1997 | Steindam ............................. 363/146 |
| 5,701,244 | * | 12/1997 | Emmert et al. ...................... 363/146 |
| 5,764,205 | * | 6/1998 | Doyle et al. ............................ 345/75 |
| 5,923,147 | * | 7/1999 | Martensson .......................... 363/146 |
| 5,995,388 | | 11/1999 | Preller ..................................... 363/21 |

FOREIGN PATENT DOCUMENTS

| | | | |
|---|---|---|---|
| 19600962 | 7/1997 | (DE) | ............................... H02M/3/24 |
| 0317783 | 5/1989 | (EP) | ............................... H02M/7/06 |
| 0626670 | 11/1994 | (EP) | ............................... G09G/1/20 |

OTHER PUBLICATIONS

*Da Grosse Wekbuch Elektronik*, Nurmann, pp. 1197–1198, figure D, XP000910792, Jul. 2000.

* cited by examiner

*Primary Examiner*—Jeffrey Sterrett
(74) *Attorney, Agent, or Firm*—Jay H. Maioli (57) ABSTRACT

First, second and third capacitors (11, 12, 13) having predetermined capacitance values are connected in series in a commercial alternating current line. A rectifier bridge (14, 15, 16, 17) including two diodes (14, 15) having backward characteristics adjusted to a Zener voltage is connected in parallel with the capacitor (12) in the center, and a smoothing capacitor is connected between a first end and a second end of the rectifier bridge (14, 15, 16, 17). As a result, it is possible to divide alternating current (AC) from a power input terminal into a desired voltage while insulating it, and clip it with a predetermined voltage to shape it into a voltage waveform close to a rectangular wave and smooth it. Thereby, a stabilized DC voltage with less ripples can be obtained.

7 Claims, 9 Drawing Sheets

DIVIDING, ISOLATING, AND RECTIFYING CIRCUIT AND STANDBY POWER SOURCE

BACKGROUND OF THE INVENTION

1. Field of the Invention

This invention relates to power supply apparatus used in an electronic apparatus like a television receiver, for example.

2. Description of the Related Art

Among recent television receivers and other electronic devices, those a remote-controller for improving the convenience have been distributed widely. Such a remote-controller includes a microprocessor as its central element, and includes various operation keys, encoder, light emitting section, and so forth. It is powered by a battery, for example, to code signals responsive to operation of various operation keys, output infrared control signals to an electronic apparatus to be controlled. In receipt of an infrared control signal, the electronic apparatus decodes the received signal and makes up detected information. Then, based on the detected information, it outputs a control signal for controlling each section and with a predetermined operation effected. For this purpose, such an electronic apparatus has a stand-by power supply in addition to its main power supply so that it can always cope with control signals sent from the remote-controller by supplying power to its photodetector and controller even when the power supply from the main power supply is stopped.

Figure 9:
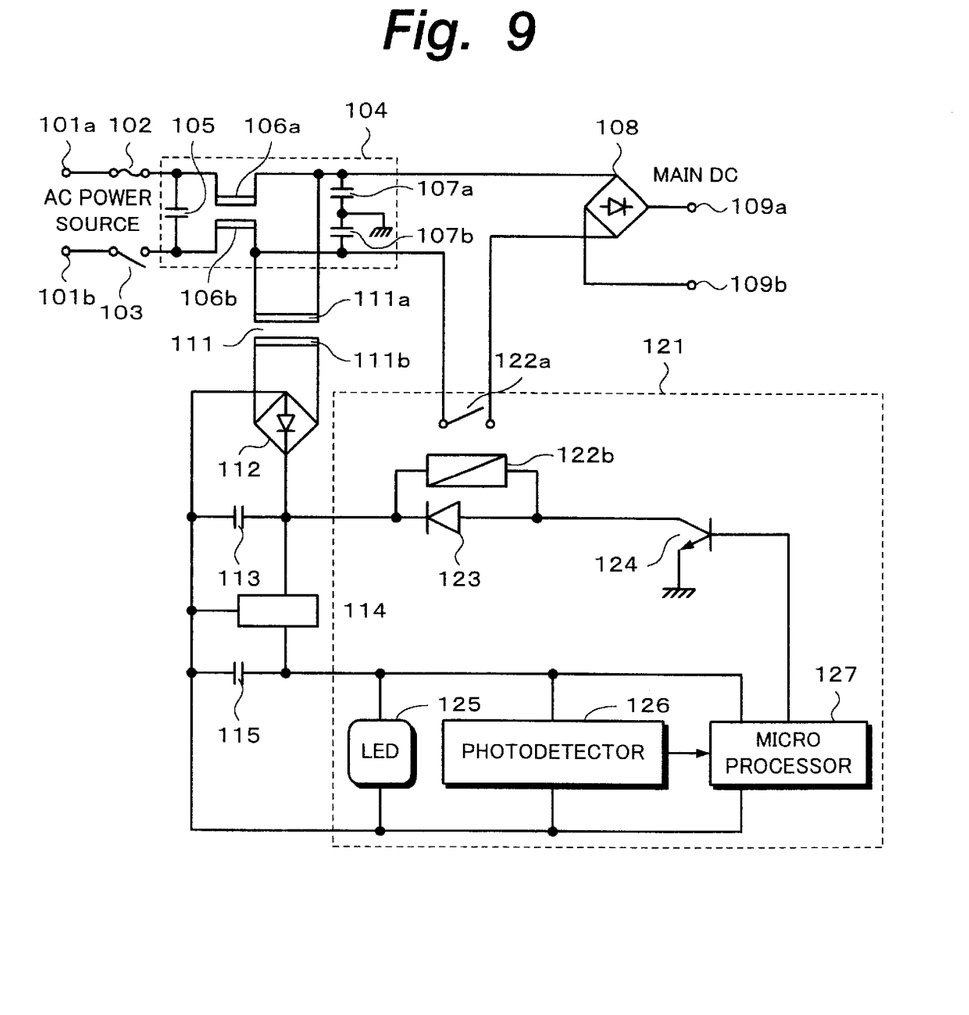
FIG. 9 is a circuit diagram used for explaining a conventional power supply apparatus.

FIG. 9 shows a power supply apparatus of an electronic apparatus matching with a conventional remote-controller. In FIG. 9, a commercial alternating current (AC) is supplied to power input terminals shown by 101a and 101b. Numeral 108 denotes a rectifier bridge, and this rectifier bridge, smoothing capacitor and three-terminal regulator, which are not shown but connected to output terminals 109a and 109b, constitute a main power supply section.

Between the power input terminal 101b and the rectifier bridge 108, a main switch 103, a choke coil 106b and a switch 122a, forming a relay, are inserted in series.

Under the condition with the main switch 103 closed by manipulation of a user, when the switch 122a of the relay is turned ON, a rectified output is generated in the output terminals 109a and 109b, and smoothed, stabilized and thereafter supplied to a main load circuit, not shown.

On the other hand, numeral 121 denotes the load circuit of the control system. By making a standby power supply section from a voltage converting and rectifying circuit made up of an insulating transformer 111, rectifier bridge 112, three-terminal regulator 114 and two capacitors 113, 115, it is possible to supply a standby power supply to the control-system load circuit 121 and cope with a control signal sent from the remote-controller even when the relay switch 122a is turned OFF and the power supply from the main power supply is stopped.

When the main switch 103 is closed, a desired AC output is produced in the secondary coil 111b of the insulating transformer 111, and this AC output is full-wave-rectified by the rectifier bridge 112. Then, the full-wave-rectified output is smoothed by the capacitor 113, and a direct current (DC) stabilized in 5V, for example, is generated at the output terminal of the three-terminal regulator 114. This output voltage is supplied to LED 125, photodetector 126 and microcomputer 127, respectively, to activate the LED 125, photodetector 126 and microprocessor 127.

OBJECTS AND SUMMARY OF THE INVENTION

In the power supply apparatus of the conventional electronic device, as main power losses during standby periods, there are the excitation loss by the insulating transformer and the regulation loss of the three-terminal regulator. From the power-saving viewpoint, there is the demand for reducing these power losses in the standby periods.

According to the invention, there is provided a power supply apparatus connected to an alternating current to obtain a stabilized direct current voltage, comprising:

an AC voltage dividing means for dividing said AC voltage to a predetermined voltage including a first capacitor having one end connected to one of terminals of an alternating current and having a predetermined capacitance value, a second capacitor having one end connected to the other terminal of the alternating current and having a predetermined capacitance value, and a third capacitor having one end connected to the other end of the first capacitor and the other end connected to the other end of the second capacitor and having a predetermined capacitance value;

a rectifying and voltage-control means including a first rectifier element having a cathode connected to one end of the third capacitor and having a predetermined constant-voltage characteristic in a reverse voltage direction, a second rectifier element having a cathode connected to the other end of the third capacitor, an anode connected to the anode of said first rectifier element and a characteristic approximately equal to the first rectifier element in the backward voltage direction, a third rectifier element having an anode connected to one end of the third capacitor, and a fourth rectifier element having an anode connected to the other end of the third capacitor and a cathode connected to the cathode of the third rectifier element; and a smoothing means for smoothing said DC voltage connected between a common connection point of the anodes of the first rectifier element and the second rectifier element and a common connection point of the cathodes of the third rectifier element and said fourth rectifier element.

In this embodiment, three capacitors having predetermined capacitance values are connected in series in an AC line, the rectifier bridge having two diodes whose reverse voltage characteristics are adjusted to a predetermined Zener voltage is connected in parallel with a capacitor located in the center, and a smoothing capacitor is connected to the rectifier bridge. As a result, it is possible to divide the AC voltage into a predetermined AC voltage and an isolate AC voltage at the same time. Additionally, it is possible to obtain a stabilized DC voltage with less ripples by clipping the AC voltage with the predetermined Zener voltage and smoothing it.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
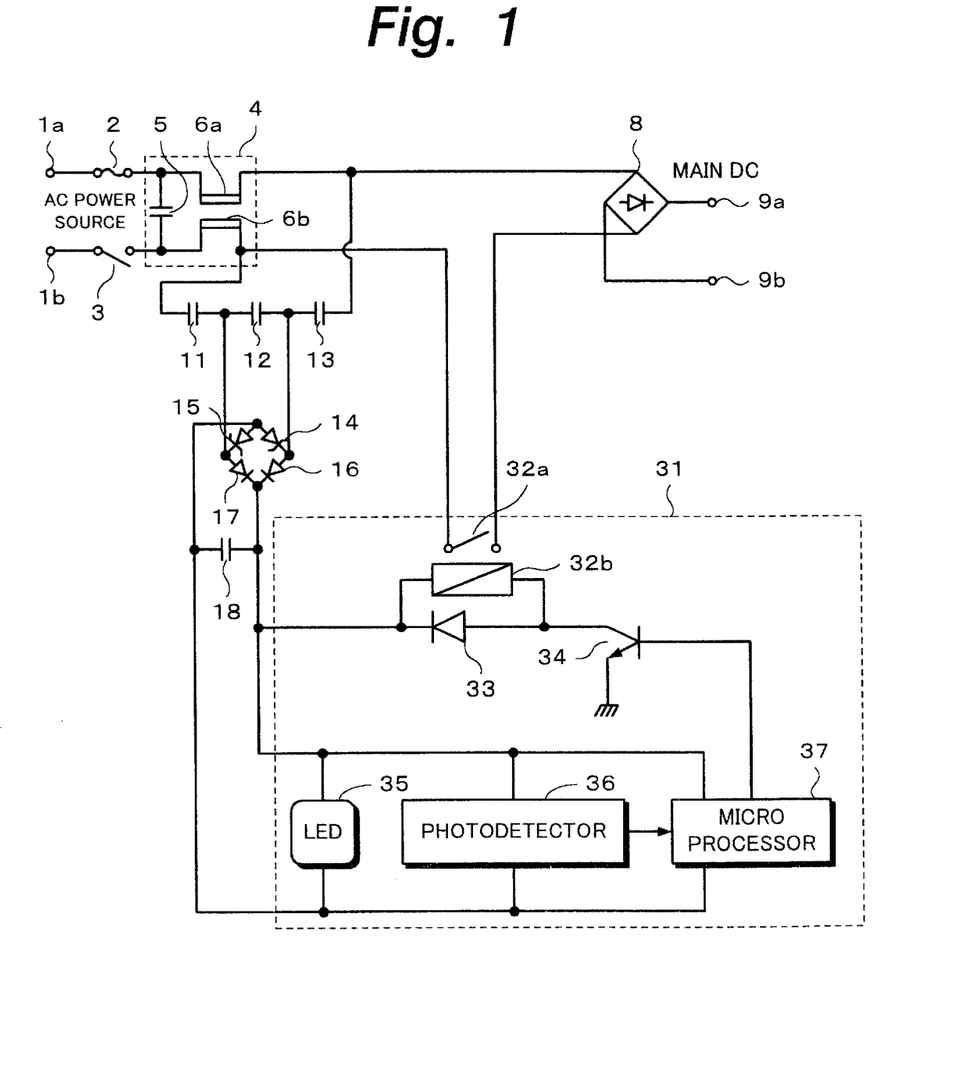
FIG. 1 is a circuit diagram showing a configuration of the first embodiment of the invention.

Explained below is an embodiment of the invention with reference to the drawings. FIG. 1 shows a configuration of this embodiment of the invention, and FIGS. 2A through 2E show voltage waveforms at various portions in the circuit. In FIG. 1, AC is supplied to power input terminals shown by 1a and 1b. A line filter 4 is made up of a capacitor 5, and a pair of choke coils 6a and 6b for removal of common mode noise.

Between one of power input terminals 1a, and a rectifier bridge 8, a fuse 2 and the choke coil 6a are inserted in series. Between the other input terminal 1b and the rectifier bridge 8, a main switch 3, choke coil 6b and a switch 32a, forming a relay explained later, are inserted in series.

One end of the rectifier bridge 8 is connected to an output terminal 9a, and the other end of the rectifier bridge 8 is connected to an output terminal 9b. The rectifier bridge 8 forms a main power supply section together with a smoothing capacitor, regulator and other elements, not shown.

The main switch 3 is provided on an operation panel, not shown. While the main switch 3 is operated and closed by a user, when the relay switch 32a is turned ON, a rectified output is generated at the output terminals 9a and 9b, and after being smoothed and stabilized, it is supplied to a main load circuit, not shown.

On the other hand, numeral 31 denotes a load circuit of a control system. The control system circuit 31 includes a relay made of a switch 32a and a coil 32b, an NPN transistor 34 for switching, a LED section 35, a photodetector 35 and a microprocessor 37.

By constituting a standby power supply section from three capacitors 11, 12, 13 for dividing the AC voltage, two diodes 14, 15 which have functions for rectifying and stabilizing voltage, and rectifier diodes 16, 17 and smoothing capacitor 18, it is configured to supply a standby power to the circuit 31 of control system load and cope with a control signal sent from a remote-controller even when the power supply from the main power supply section is stopped.

Between the connection point of the choke coil 6a and the rectifier bridge 8 and the connection point of the choke coil 6b and the switch 32a, three capacitors 11, 12 and 13 are connected in series. The capacitors 11 and 13 are equal in capacitance, and the capacitor 12 has a capacitance of a predetermined value.

Connected to the point of the capacitors 11 and 12 are the cathode of the diode 15 and the anode of the rectifier diode 17. Connected to the point of the capacitors 12 and 13 are the cathode of a diode 14 and the anode of a rectifier diode 16. Forward voltage characteristics of the diodes 14 and 15 are the same as the rectifier diodes 16 and 17, and their reverse voltage characteristics are different from the rectifier diodes 16 and 17 so as to have a predetermined Zener voltage and become conductive when a voltage of 6 volts, for example, is applied. And even when applied voltage is more than 6 volts, the anode of these diodes 14 and 15 are clipped and the voltage of them are kept at 6 volts. Anodes of these diodes 14 and 15 having these characteristics are connected together, and their connection point forms a secondary ground line. Further, cathodes of the rectifier diodes 16 and 17 are connected together, and a standby power is output from their connection point. The smoothing capacitor 18 is connected between the standby power output and the secondary ground line.

In the standby power supply section having the above-explained configuration, AC supplied voltage from the power input terminals 1a and 1b is divided into a predetermined voltage, insulated, rectified and smoothed so that a stabilized DC voltage with less ripples is output. This standby power supply section also functions to protect the circuit, and any noise generated at the input side and various kinds of noise generated at the output side are absorbed by the diodes 14 and 15.

One end of the relay coil 32b is connected to the standby power output, the collector of the transistor 34 is connected to the other end of the relay coil 32b, and the emitter of the transistor 34 is connected to the secondary ground line. Connected to the base of the transistor 34 is a control terminal of the microprocessor 37, and a control signal is supplied from the microprocessor 37. Connected at opposite ends of the coil 32b is a diode 33 for absorbing energy generated when the coil 32b is OFF.

Further connected to the standby power output are the LED section 35, photodetector 36 and microprocessor 37.

Figure 2A:
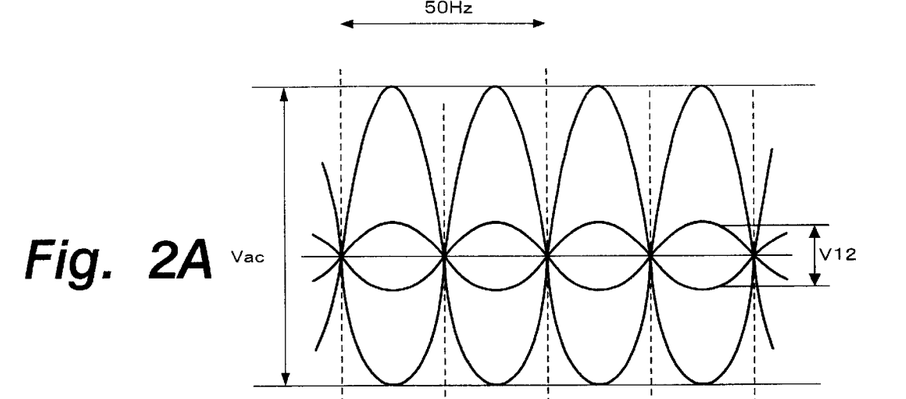
FIGS. 2A through 2E are waveform diagrams used for explanation of operations of the first embodiment of the invention.
Figure 2B:
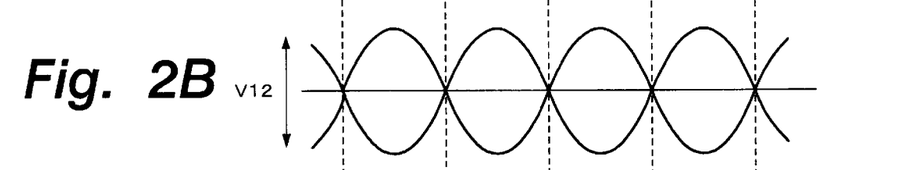

Operations of the embodiment having the above-explained configuration are explained below in greater detail. When the main switch 3 is turned ON, an AC voltage of 50 Hz, for example, is applied to opposite ends of the capacitors 11, 12, 13 as shown in FIG. 2A. If the AC voltage is Vac, capacitance values of the capacitors 11, 12, 13 are C11, C12 and C13, respectively, and the voltage across the opposite ends of the capacitor 12 is V12, then the relation of Equation (1) below is established between the voltage V12 and the capacitance values of the capacitors, and the voltage V12 divided into a predetermined voltage is obtained across the opposite ends of the capacitor 12. FIG. 2B shows the voltage V12 in an enlarged scale for easier view.

$$V12 = Vac \times C11 / (2 \times C12 + C11) \quad (1)$$

$$= Vac \times C13 / (2 \times C12 + C13) \text{ where } C11 = C13$$

Figure 2C:
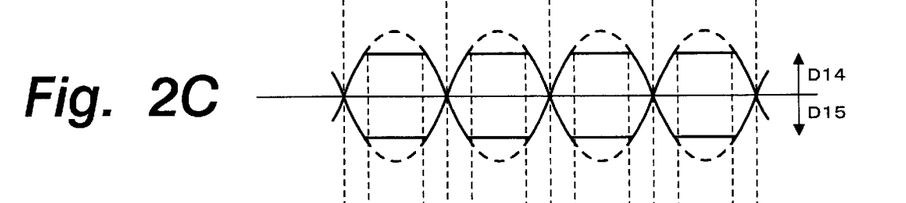
Figure 2D:
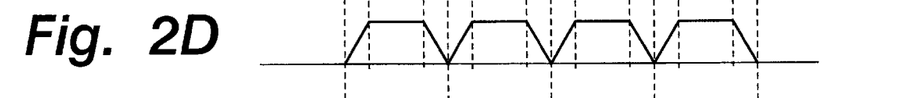
Figure 2E:
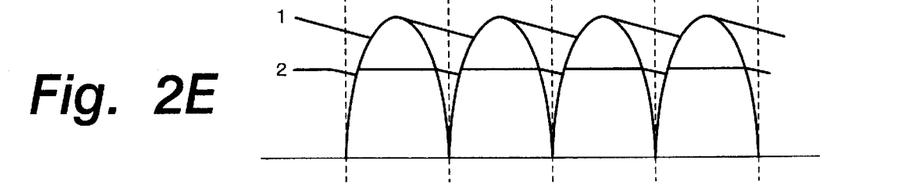

The voltage divided to the opposite ends of the capacitor 12 is applied between the cathode of the diode 14 and the cathode of the diode 15, and applied between the anode of the diode 16 and the anode of the diode 17. Assuming that the Zener voltage of the diode 14 in the reverse voltage characteristic is D14 and the Zener voltage of the diode 15 in the reverse voltage characteristic is D15, the peak voltage of a positive half cycle of the AC voltage shown by the broken line in FIG. 2C is clipped by the voltage of D14, and rectified by the line of the rectifier diode 16, capacitor 18, diode 15 and capacitor 12. The peak voltage of the next negative half cycle is clipped by the voltage of D15, and rectified by the line of the rectifier diode 17, capacitor 18, diode 14 and capacitor 12. As a result, the rectified waveform shown in FIG. 2D is obtained, and when it is smoothed by the capacitor 18, a stabilized DC voltage with less ripples can be obtained. FIG. 2E shows the magnitudes of ripple voltages contained in the smoothed DC voltage for the comparison purpose, in which 1 denotes the ripple voltage not clipped whereas 2 denotes the ripple voltage clipped by a predetermined voltage. As the time between a peak to another peak becomes short and a voltage dropped by discharging becomes small, the ripples are improved largely.

When the Zener voltage D14 of the diode 14 and the Zener voltage D15 of the diode 15 are equal, and the forward voltages of the diodes 16 and 17 are Vfd16 and Vfd17, respectively, output voltage Vc18 between the standby power output line and the secondary ground line becomes the value shown by Equation (2).

$$Vc18 = D14 - Vfd16 \approx D15 - Vfd17 \qquad (2)$$

Actually, the voltage V12 generated at opposite ends of the capacitor 12 is affected by impedance of the load side as shown by Equation (3) below.

$$V12 = Vac \times ZC11 / (Z2C12 \times ZL / (Z2C12 + ZL))$$
$$= Vac \times ZC13 / (Z2C12 \times ZL / (Z2C12 + ZL)) \qquad (3)$$

where ZC11 is the impedance of the capacitor 11, ZC13 is the impedance of the capacitor 13, Z2C12 is an impedance of a value that is twice that of capacitor 12, and ZL is the impedance of the load side including the rectifier diodes 16 and 17. Since the voltage drops due to the impedance of the load side in this manner, the condition shown by Equation (4) below is required for constant-voltage operations of the diodes 14 and 15.

$$V12 \geq D14, \; V12 \geq D15 \qquad (4)$$

Capacitance values of the capacitors 11, 12 and 13 are selected in optimum values by taking the condition required for constant-voltage operations, voltage fluctuations of the commercial AC voltage, and other factors into account. For example, for compliance with worldwide commercial ACs, it should be taken into consideration that the input voltage fluctuates from AC85V to AC280V, and capacitance values of the capacitors 11, 12 and 13 are selected to ensure that the voltage divided under the condition with the minimum voltage 85V and the maximum load be a voltage value not lower the Zener voltages of the diodes 14 and 15. This range is capable of supplying currents of these standby power supplies is limited to the maximum allowable current of reverse voltage characteristics of the diodes 14 and 15, and it is limited to 10 mA in the case of currently available ordinary Zener diodes, and is an optimum of the standby power supply of the remote-controller.

In this manner, the output voltage Vc18 between the standby power line and the secondary ground line is smoothed by the smoothing capacitor 18, and a DC voltage with less ripples is output. This standby power output voltage is supplied to the LED 35, photodetector 36 and microprocessor 37, respectively, to establish the standby mode.

LED section 35 is made of a limitative resistor and a LED element, and it is mounted on an operational panel, not shown, for example. The LED section 35 is lit by an output voltage from the voltage converting and rectifying circuit to show a user that the apparatus to be controlled is in a standby mode.

The photodetector 35 is made of a photo diode, decoder, and so on. In the operation mode where the output voltage from the voltage converting and rectifying circuit is supplied to the photodetector 35, when it receives a control signal from the remote-controller, not shown, it decodes the signal to make detected information, and supplies this detected information to the microprocessor 37.

The microprocessor 37 monitors the operation mode of the remote-controller on the basis of the detected information from the photodetector 36. Therefore, when an instruction for operating the main power supply section is entered through the remote-controller, a control signal is output from the microprocessor 37. In response to this control signal, the transistor 34 becomes conductive, a current flows in the relay coil 32b, the switch 32a turns ON, and a full-wave rectified output from the rectifier bridge 8 is generated at the output terminals 9a and 9b. The full-wave rectified output is smoothed and supplied to the main load circuit, and an operation of the main load side is started. In contrast, when an instruction for changing the main power supply section from the operative mode to the non-operative mode is entered through the remote-controller, the control signal becomes a LOW level, and the transistor 34 becomes non-conductive. Therefore, no current flows in the relay coil 32b, the switch 32a turns OFF to interrupt AC, and therefore, the power supply from the main power supply section is stopped.

Figure 3:
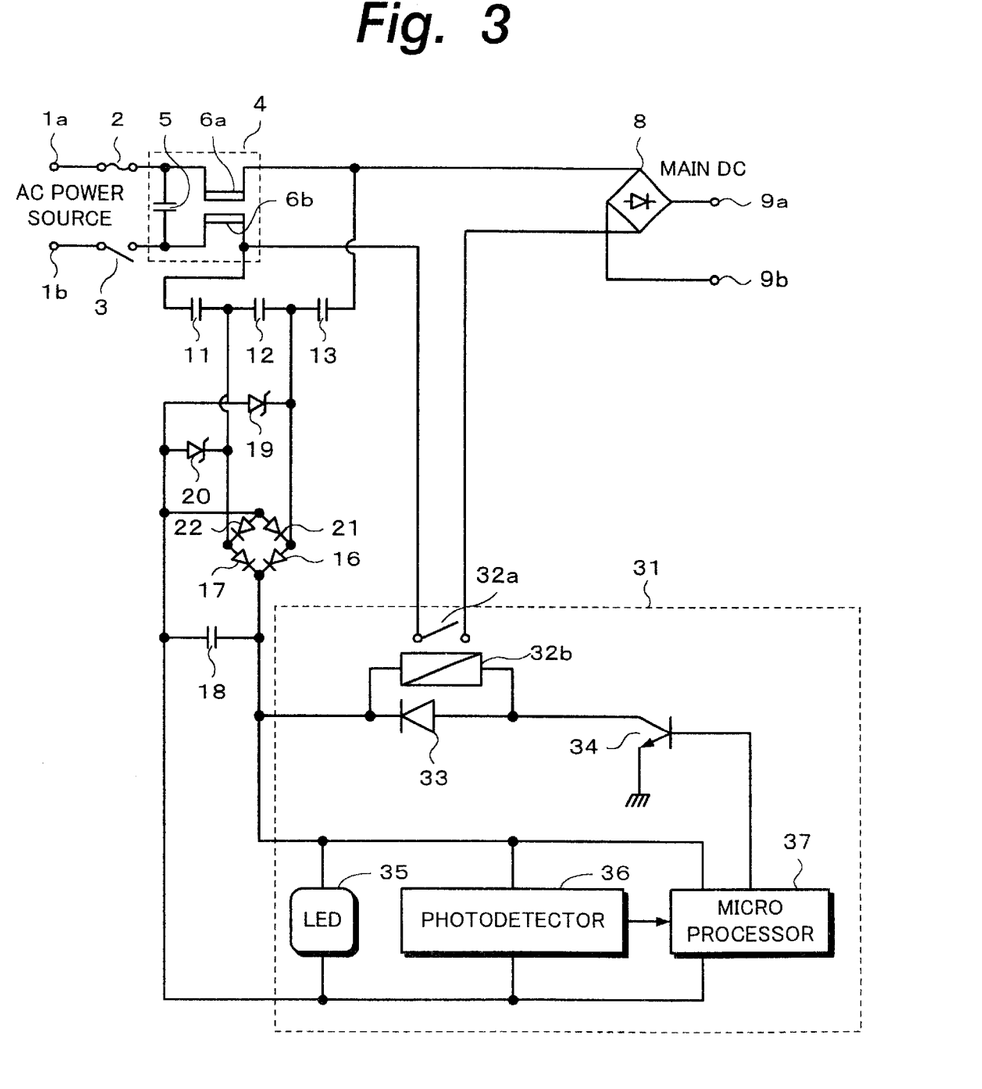
FIG. 3 is a circuit diagram of a modified form of the first embodiment of the invention.

The above embodiment has been explained as using the diodes 14 and 15 having the same forward voltage characteristics as those of conventional rectifier diodes and having reverse voltage characteristics adjusted to have a predetermined Zener voltage. However, as shown in FIG. 3, rectifier diodes 21 and 22 having the same characteristics as the rectifier diodes 16 and 17 may be used in lieu of the diodes 14 and 15 to form a typical rectifier bridge, connecting the rectifier diodes 21 and 22 in parallel and connecting Zener diodes 19 and 20 for being conductive at the same reverse voltage as the diodes 14 and 15. This constitution requires more circuit elements but ensures the same effect.

Further, the above embodiment has been explained as using the LED section 35 as means for displaying the standby mode. However, display may be provided by using another kind of display element or mechanical structure. Furthermore, although the above embodiment uses the photodetector 36 made of a photo diode, decoder and other elements to deal with control signals, if an ultrasonic wave or radio wave is used, a receiver section matching with the signal transmission mode of the remote-controlled transmitter is provided.

Figure 4:
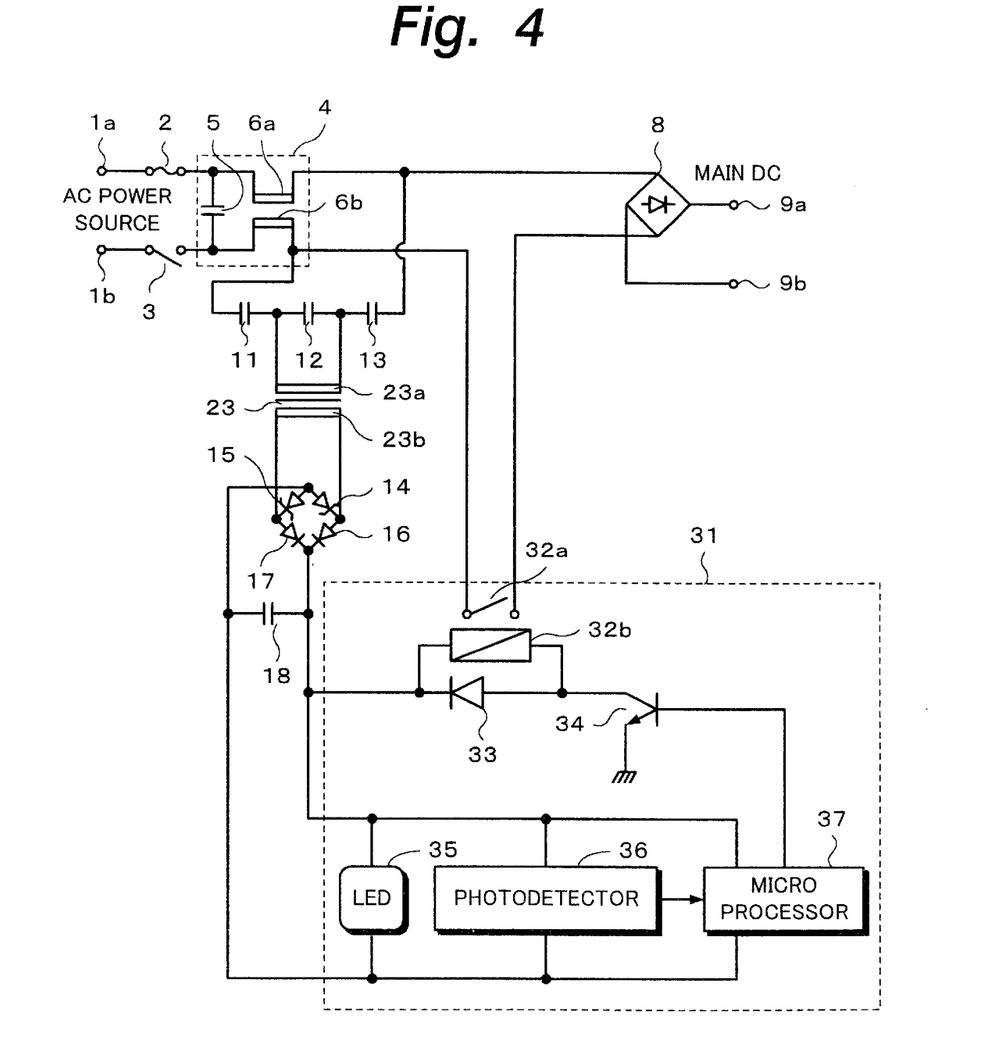
FIG. 4 is a circuit diagram showing a configuration of another modified form of the invention.

FIG. 4 shows configuration of another modified form of the invention. In FIG. 4, elements or parts equivalent to those of the foregoing embodiment shown in FIG. 1 are labeled with common reference numerals, and portions or sections having the same configuration are omitted from explanation. The modified form shown here additionally uses an isolating transformer 23 in the above-explained standby power supply section.

The primary coil 23a of the isolating transformer 23 is connected to opposite ends of the capacitor 12 which is the central one of three capacitors 11, 12 and 13 connected in series, adjusted to have predetermined capacitance values and connected in an AC line through a line filter 4.

As to the secondary coil 23 of the isolating transformer 23, the cathode of the diode 15 and the anode of the rectifier diode 17 are connected to one end, and the cathode of the diode 14 and the anode of the rectifier diode 16 are connected to the other end.

With this configuration, since the AC is isolated by the isolating transformer 23, three capacitors 11, 12 and 13 connected in the power line can be selected by taking into consideration only their function of dividing AC into a predetermined AC voltage. Therefore, their capacitance values can be chosen more freely.

Figure 5:
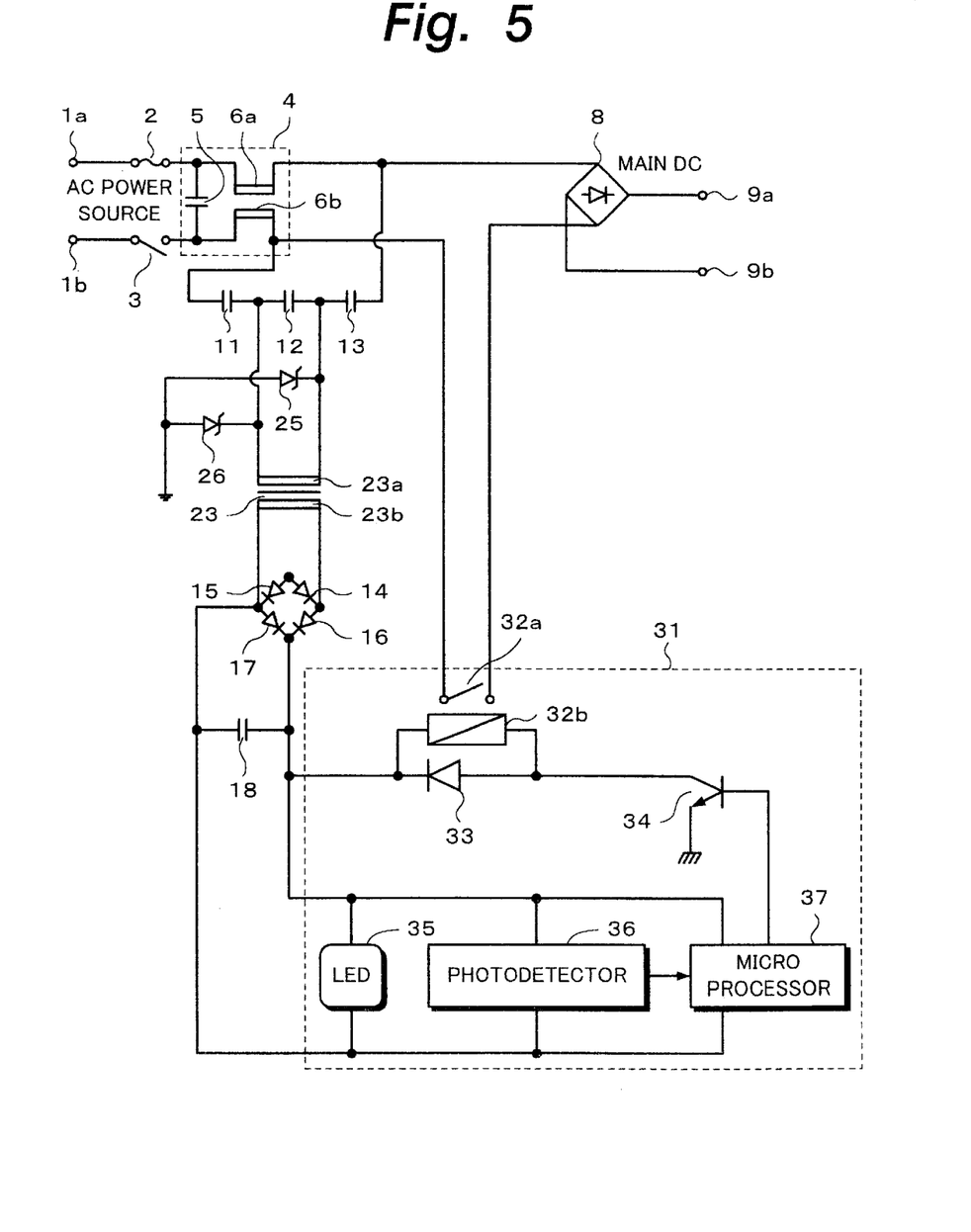
FIG. 5 is a circuit diagram of a modified form of the further embodiment of the invention.

The above modified form has been explained as using the diodes 14 and 15 having the same forward voltage characteristics as those of conventional rectifier diodes and having reverse voltage characteristics adjusted to have a predetermined Zener voltage. However, as shown in FIG. 5, it is also possible to additionally connect the cathode of a Zener diode 25 to one end of the primary coil 23*a* of the isolating transformer, connect the cathode of a Zener diode 26 to the other end of the primary coil 23*a* of the isolating transformer, and connect the anodes of the Zener diodes 25 and 26 to one end of the rectifier bridge 8 nearer to the main load. In this constitution, although the number of circuit elements increases because of additional connection of the Zener diodes 25 and 26, the same effect is obtained.

Figure 6:
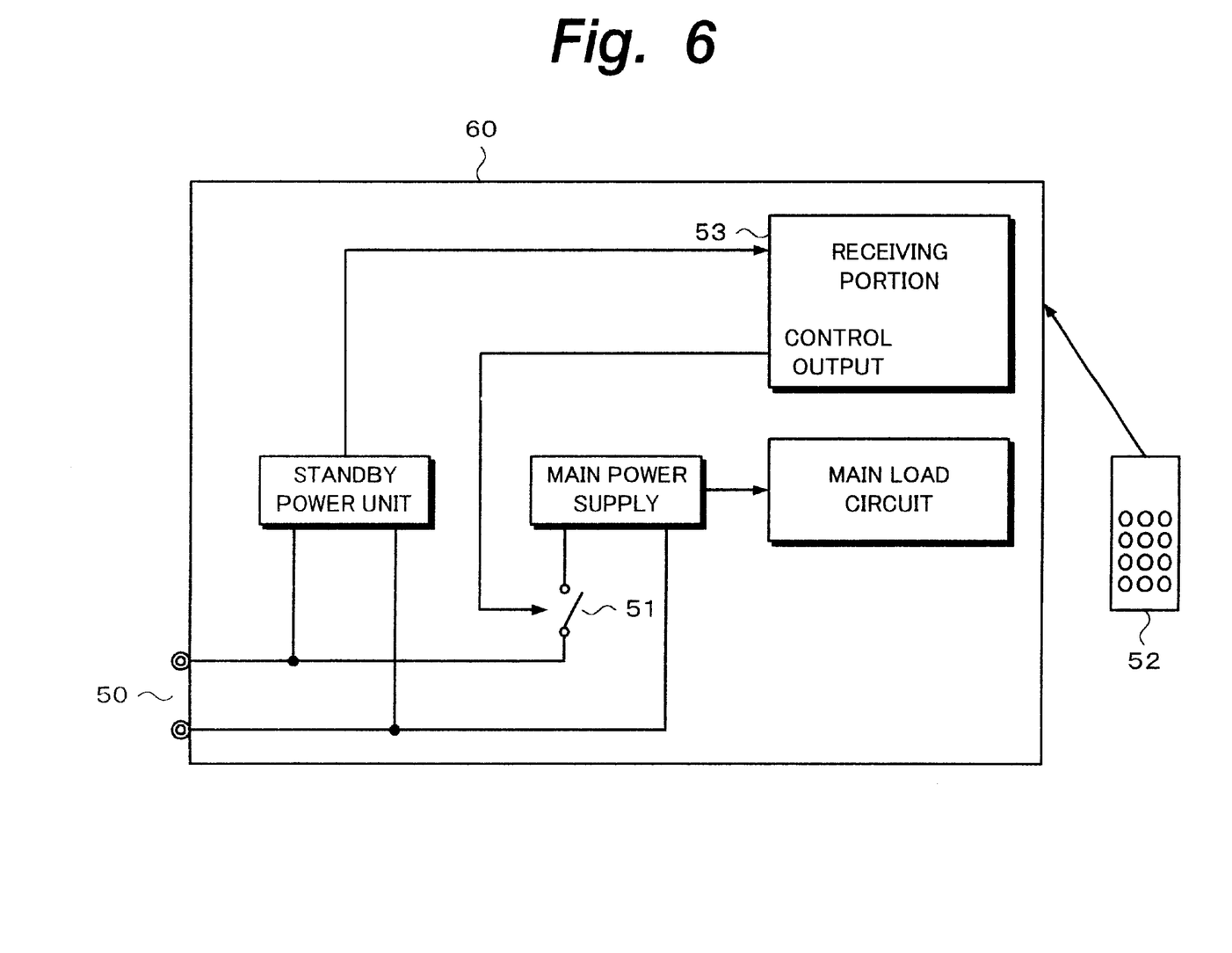
FIG. 6 is a block diagram showing configuration of an electronic apparatus having the power supply apparatus according to any one of the embodiments shown in FIGS. 1 through 6.

FIG. 6 shows configuration of an electronic apparatus 60 having the power supply apparatus according to the embodiments explained above. A power control signal sent from the remote-controller 52 is decoded by a control section of a control system load circuit 53, and a power control signal is output to control a relay 51 connected in series to the main power supply section. As a result, AC input 50 is interrupted or supplied to control the supply of the main power. Also, the power control signal may be sent to the control section by using a contact switch, for example, instead of the remote-controller.

Figure 7:
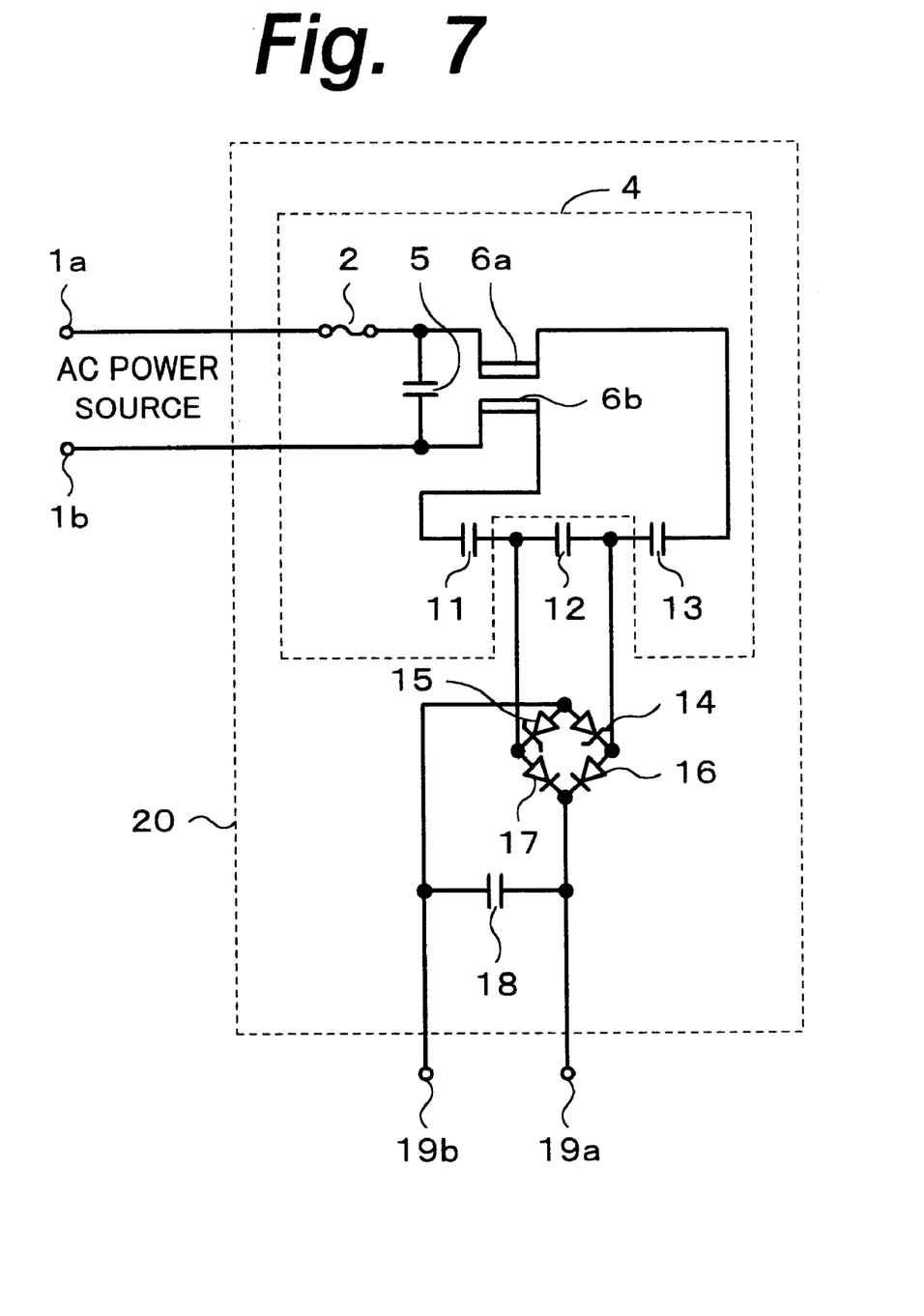
FIG. 7 is a circuit diagram of a modified version of the embodiment of FIG. 1.

Some embodiments have been explained above as being composed of a main power supply section and a standby power supply section and being used in combination with a control system load circuit powered by the standby power supply section to cope with a control signal sent from the remote-controller even when the power from the main power supply section is stopped. However, by independently using the standby power supply section as the power supply apparatus, a DC voltage of a relatively small current capacitance can be supplied from AC. An embodiment of this concept is shown in FIG. 7. In FIG. 7, elements or parts equivalent to those of FIG. 1 already explained are labeled with common reference numerals, and portions or sections having the same structures are omitted from explanation. In the power supply circuit having this configuration, AC voltage supplied from the power input terminals 1*a* and 1*b* is isolated and divided, then rectified and smoothed, and a stabilized DC with less ripples is output from the output terminals 19*a* and 19*b*.

Figure 8:
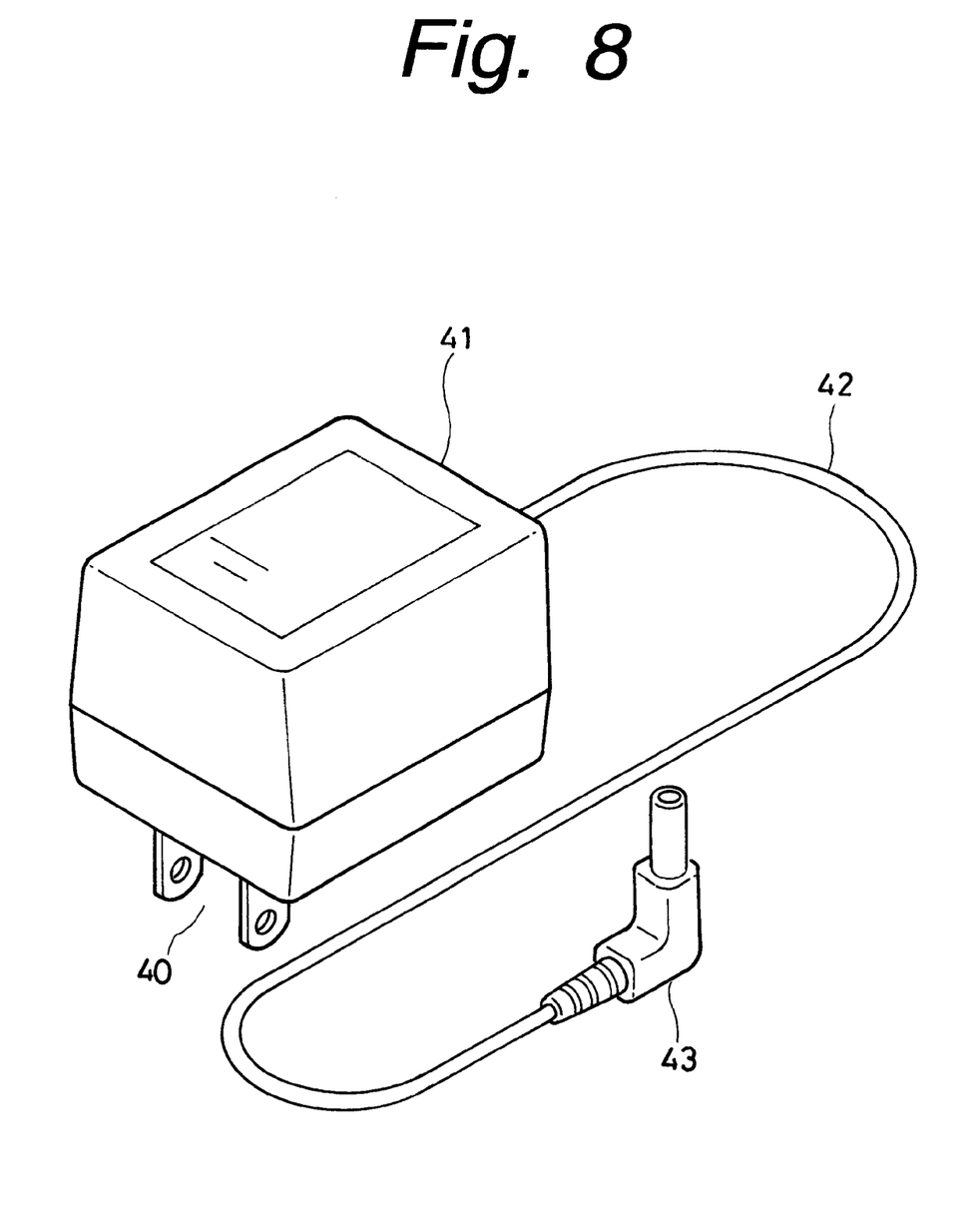
FIG. 8 is a perspective view of an AC adapter using the modified version shown in FIG. 7.

The AC adapter shown in FIG. 8 is one of applications of this embodiment. A container section 41 shown in FIG. 8 integrally contains the power circuit 20 surrounded by the outer broken line in FIG. 7 and mounted on a printed wiring board, a DC plug 43 attached to one end of a cable 42 to output a predetermined DC voltage and a plug 40 to be connected to an AC receptacle. Since the portion surrounded by the inner broken line 4 in FIG. 7 is not isolated from the AC voltage, an insulating material is used as the container section 41. Since this AC adapter uses no isolating transformer, it can be reduced in weight and size.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. An alternating current voltage dividing, isolating and rectifying circuit to obtain a direct current voltage, comprising:

alternating current voltage dividing and isolating means for dividing said alternating current voltage into a predetermined voltage using a series circuit of at least three capacitors, said series circuit inserted between lines of an alternating current voltage source, for outputting a divided and isolated alternating current voltage from both ends of one capacitor of the at least three capacitors that is isolated from the lines of alternating current source;

rectifying and smoothing means for rectifying and smoothing said divided and isolated alternating current voltage to obtain a direct current voltage.

2. The alternating current voltage dividing, isolating and rectifying circuit according to claim 1, wherein said rectifying and smoothing means includes a first rectifier element having a cathode connected to a first end of the isolated capacitor and having a predetermined constant-voltage characteristic in a reverse voltage direction, a second rectifier element having a cathode connected to a second end of the isolated capacitor, with an anode connected to an anode of said first rectifier element and with a voltage characteristic substantially equal to a voltage characteristic of said first rectifier element in the reverse voltage direction, a third rectifier element having an anode connected to the first end of the isolated capacitor, and a fourth rectifier element having an anode connected to the second end of the isolated capacitor and a cathode connected to a cathode of said third rectifier element; and a smoothing capacitor connected between a common connection point of the anodes of said first rectifier element and said second rectifier element and a common connection point of the cathodes of said third rectifier element and said fourth rectifier element.

3. A standby power supply apparatus comprising:

alternating current voltage dividing and isolating means for dividing an alternating current voltage into a predetermined voltage using a series circuit of at least three capacitors inserted between lines of an alternating current voltage source for outputting a divided and isolated alternating current voltage from both ends of a capacitor of the at least three capacitors that is isolated from the lines of the alternating current voltage source;

rectifying and smoothing means for rectifying and smoothing the divided and isolated alternating current voltage to obtain a direct current voltage;

receiver means for receiving a control signal and creating information responsive to an operation mode of remote control means;

control means responsive to the information from said receiver means to control a delivery of said alternating current voltage to a main load circuit by an ON/OFF instruction through said remote control means, said receiver means and said remote control means are fed by said direct current voltage regardless of said delivery of said alternating current voltage to the main load circuit.

4. An AC adapter comprising:

alternating current voltage dividing and isolating means for dividing an alternating current voltage into a predetermined voltage using a series circuit of at least three capacitors inserted between lines of an alternating current voltage source for outputting a divided and isolated alternating current voltage from both ends of a capacitor of the at least three capacitors that is isolated from the lines of said alternating current voltage source;

rectifying and smoothing means for rectifying and smoothing the divided and isolated alternating current voltage;

a container section which contains said alternating current voltage dividing and isolating means and said rectifying and smoothing means for isolating said alternating current voltage;

a pair of plugs, to be inserted into an alternating current power source, project from a first surface of said container section and feed said alternating current voltage to said alternating current voltage dividing and isolating means;

a cable connected to said smoothing means externally extends from a second surface of said container section over a predetermined length; and a direct current voltage output terminal is connected to said cable for outputting a direct current voltage.

5. The AC adapter according to claim 4, wherein said container section is formed of an electrically isolating material for electrically isolating said alternating current voltage.

6. The AC adapter according to claim 4, further comprising a printed wiring board located in the container section and wherein said alternating current voltage dividing and isolating means and said rectifying and smoothing means are mounted on the printed wiring board.

7. The AC adapter according to claim 4, wherein said cable and said direct current voltage output terminal are formed integrally.

* * * * *